United States Patent [19]
Sakata et al.

[11] Patent Number: 5,729,428
[45] Date of Patent: Mar. 17, 1998

[54] SOLID ELECTROLYTIC CAPACITOR WITH CONDUCTIVE POLYMER AS SOLID ELECTROLYTE AND METHOD FOR FABRICATING THE SAME

[75] Inventors: Koji Sakata; Yuji Aoki; Toshihiko Nishiyama; Satoshi Arai; Syuichi Nagashima, all of Toyama, Japan

[73] Assignee: NEC Corporation, Tokyo, Japan

[21] Appl. No.: 639,111

[22] Filed: Apr. 24, 1996

[30] Foreign Application Priority Data

Apr. 25, 1995 [JP] Japan .................. 7-100958

[51] Int. Cl.$^6$ ............................................. H01G 9/00
[52] U.S. Cl. .................. 361/523; 361/525; 361/509; 361/524; 29/25.43
[58] Field of Search ............................ 361/508, 509, 361/512, 514, 523, 524, 525–530, 506, 527, 528, 529, 504, 534; 29/25.03

[56] References Cited

U.S. PATENT DOCUMENTS

| | | | |
|---|---|---|---|
| 4,805,074 | 2/1989 | Harakawa et al. | 361/525 |
| 5,187,650 | 2/1993 | Kudoh et al. | 361/525 |
| 5,424,907 | 6/1995 | Kojima et al. | 361/532 |

FOREIGN PATENT DOCUMENTS

| | | |
|---|---|---|
| 52-79255 | 7/1977 | Japan . |
| 60-37114 | 2/1985 | Japan . |
| 3-64013 | 8/1989 | Japan . |
| 2-74021 | 3/1990 | Japan . |
| 2-219211 | 8/1990 | Japan . |
| 3-64013 | 3/1991 | Japan . |
| 3-285321 | 12/1991 | Japan . |
| 4-73924 | 3/1992 | Japan . |

Primary Examiner—Leo P. Picard
Assistant Examiner—Anthony Dinkins
Attorney, Agent, or Firm—Sughrue, Mion, Zinn, Macpeak & Seas, PLLC

[57] ABSTRACT

The solid electrolytic capacitor disclosed has an electron donor organic compound layer of an organic compound provided between an oxide film as a dielectric and a conductive polymer layer and a conductive polymer layer as a solid electrolyte layer. In the step of forming the electron donor organic compound layer, the pellet on which the oxide film is formed, is caused to be exposed to vapor of the electron donor organic compound, and this enables the formation of a thin and uniform electron donor organic compound layer on the oxide film irrespective of the kind of electron donor organic compound. The pellet may alternatively be dipped in a solution of the electron donor organic compound. Where the dipping process uses silane coupling agent, aluminum coupling agent or titanium coupling agent, the thin and uniform electron donor organic compound layer can be formed by using alcohol solution or acidic solution of each coupling agent. The solid electrolytic capacitor having such a conductive polymer as a solid electrolyte is free from leakage current increase under high temperature condition.

26 Claims, 4 Drawing Sheets

SOLID ELECTROLYTIC CAPACITOR WITH CONDUCTIVE POLYMER AS SOLID ELECTROLYTE AND METHOD FOR FABRICATING THE SAME

BACKGROUND OF THE INVENTION (1) Field of the Invention

This invention relates to solid electrolytic capacitors and methods for fabricating the same, and more particularly to solid electrolytic capacitors in which conductive polymers are used as solid electrolytes and which are free from leakage current increase under high temperature conditions, and methods for fabricating the same.

(2) Description of the Related Art

With recent size reduction, speed increase and digitalization of electronic devices, there is a strong demand in the capacitor field for capacitors to be compact and to have large capacity and low impedance in a high frequency region.

Among capacitors for high frequency purposes are mica capacitors and laminate ceramic capacitors. These capacitors, however, are not suited for size reduction of devices because increasing their capacitance increases their size although this may not be a problem when their capacitance is small. Capacitors that are applicable as high capacitance capacitors are aluminum electrolytic capacitors and tantalum solid electrolytic capacitors. In these electrolytic capacitors, however, the electrolyte (i.e., liquid electrolytes in aluminum electrolytic capacitors and manganese dioxide in tantalum electrolytic capacitors) that is employed has high resistance and, therefore, it is difficult to obtain capacitors which provide sufficiently high impedance in a high frequency range.

Capacitors with reduced impedance in high frequency range, have been developed using 7,7', 8,8'-tetracyanoquinodimethane complex (TCNQ complex), which is a low resistivity organic semiconductor, as an electrolyte. Such solid electrolytic capacitors are disclosed in, for instance, Japanese Patent Application Kokai Publication No. Sho 52-79255.

After this, solid electrolytic capacitors with sufficiently reduced high frequency range impedance, have been developed by using conductive polymers with lower resistivities than those of manganese dioxide and TCNQ complex as the solid electrolyte. Such solid electrolytic capacitors are disclosed in, for instance, Japanese Patent Application Kokai Publication No. Sho 60-37114. The solid electrolytic capacitors using these conductive polymers, with the low solid electrolyte resistivity feature, have been improved in various ways in their other characters for further enhancing their utility.

For example, Japanese Patent Application Kokai Publication No. Hei 3-64013 discloses solid electrolytic capacitors, which use a surface active agent interposed between an oxide film as a dielectric and a conductive polymer layer as a solid electrolyte to improve the wetting property of the oxide film surface when forming the conductive polymer layer for preventing the reduction in electrostatic capacitance and the lowering of break-down voltage, while also improving tan δ.

Japanese Patent Application Kokai Publication No. Hei 2-74021 and Japanese Patent Application Kokai Publication No. Hei 4-73924 disclose solid electrolytic capacitors, which use a silane coupling agent, a titanium coupling agent or an aluminum coupling agent interposed between a dielectric oxide film and a conductive polymer layer. In these capacitors, the reduction in the electrostatic capacitance and deterioration in the dissipation factor under high temperature conditions, are prevented by making use of the property that the coupling agent has an effect of improving the adhesive power between the oxide film and the conductive polymer layer.

Extensive technical development is being made with an aim of reducing the leakage current in the capacitor. For example, Japanese Patent Application Kokai Publication No. Hei 2-219211 discloses solid electrolytic capacitors, in which the leakage current is reduced by carrying out reformation of the formed manganese dioxide layer on an oxide film and then forming a conductive polymer layer thereon. Japanese Patent Application Kokai Publication No. Hei 3-285321 discloses a technique of improving the leakage current by carrying out the formation of an oxide film in a sulfuric acid solution, which is a restricted condition.

As shown, in the solid electrolytic capacitors using conductive polymers as the solid electrolyte, various technical development attempts have been made in order to improve electric characteristics of the capacitor, including the leakage current.

Under these circumstances, the inventors found that the leakage current in solid electrolytic capacitors using conductive polymers increases should the capacitors be held under a high temperature condition or immediately after the capacitors are exposed to a high temperature. The prior art leakage current reduction techniques described above have a purpose of improving the leakage current prevention at normal temperatures, and no technique has been known, which concerns and aims to prevent leakage current increase under high temperatures.

SUMMARY OF THE INVENTION

An object of the invention, therefore, is to provide a solid electrolytic capacitor, which uses conductive polymers as solid electrolytes and is free from leakage current increase when exposed to a high temperature.

Another object of the invention is to provide a method for fabricating the above solid electrolytic capacitor having an excellent high temperature leakage current prevention characteristic.

According to one aspect of the invention, there is provided a solid electrolytic capacitor comprising:
 a valve action metal body as an anode side electrode;
 an oxide film as a dielectric obtained by oxidizing a surface of the valve action metal body;
 an electron donor organic compound layer formed of an organic compound having an electron donor group covering an entire surface of the oxide film; and
 a conductive polymer layer as a solid electrolyte layer covering an entire surface of the electron donor organic compound layerAccording According to another aspect of the invention, there is provided a method for fabricating a solid electrolytic capacitor having a valve action metal body as an anode side electrode, an oxide film as a dielectric obtained by oxidizing a surface of the valve action metal body, an electron donor organic compound layer formed of an organic compound having an electron donor group and covering an entire surface of the oxide film, and a conductive polymer layer as a solid electrolyte layer covering an entire surface of the electron donor organic compound layer, the method comprising the steps of:
 forming the oxide film;

forming the electron donor organic compound layer on the oxide film; and forming the conductive polymer layer on the electron donor organic compound layer, the step of forming the electron donor organic compound layer being carried out by exposing the valve action metal body, after the oxide film has been formed thereon, to vapor of the electron donor organic compound.

Usually, the leakage current in the solid electrolytic capacitor is constituted by three currents as shown by the following equation (1).

$$I = I_A + I_B + I_C \tag{1}$$

where $I_A$ represents a current of charging, $I_B$ a current of absorption, and $I_C$ a commonly termed true leakage current. In the equation (1), the first term in the right hand side is the charging current $I_A$ which flows when a voltage is applied across the solid electrolytic capacitor, and is a current component which is attenuated momentarily. The absorption current $I_B$, in the second term, is a current component based on relatively slow electric polarization or the like and proportional to -n power of time, i.e., $I_B = kt^{-n}$ (k being a proportionality constant, t being time). The leakage current $I_C$ in the third term, is a steady-state current component flowing through the oxide film as a dielectric and not time-dependent.

In a well-known structure of capacitor using a conductive polymer as a solid electrolyte, in which the dielectric oxide film and the conductive polymer layer are in direct contact with each other, the leakage current is high compared to earlier capacitors using manganese dioxide as a solid electrolyte. This is so because the absorption current $I_B$ mentioned above is high in the capacitor using a conductive polymer. More specifically, it is said that pull-out of electrons from the oxide film by the conductive polymer layer results in generation of the oxide film in a region in which electrons are lacking. Consequently, when a positive bias voltage is applied across the solid electrolytic capacitor, the potential barrier with respect to injected electrons is low compared to that prior to the formation of the conductive polymer layer.

For this reason, in the capacitor using a conductive polymer as an electrolyte, the magnitude of the leakage current is strongly affected by a current component, which is variable and depends on the degree of restoration of the potential barrier that has been reduced by the formation of the conductive polymer layer. This current component is the absorption current $I_B$ mentioned above. In the capacitor using a conductive polymer as an electrolyte, the leakage current I depends on the absorption current $I_B$.

What restores the reduced potential barrier to the initial level is water adsorbed on the surface of the oxide film. The water adsorbed on the oxide film surface is momentarily dissociated into hydrogen ions and hydroxide ions when a positive bias voltage across the solid electrolytic capacitor is applied. The hydroxide ions thus liberated act as a potential barrier with respect to injected electrons. Consequently, the potential barrier is restored to an extent corresponding to the amount of hydroxide ions liberated. In other words, the level to which the reduced potential barrier is restored, depends on the amount of hydroxide ions held adsorbed on the oxide film surface, that is, the amount of the adsorbed water. This means that, in the capacitor using a conductive polymer as an electrolyte, the potential barrier is not restored sufficiently under a high temperature condition, under which the amount of water is reduced markedly by being separated, thus resulting in an increase in the leakage current. Particularly, in a tantalum solid electrolytic capacitor with tantalum serving as a valve action metal, chemical bonding with hydroxide groups that takes place with the aluminum oxide film ($Al_2O_3$), does not occur because the tantalum oxide film ($Ta_2O_5$) is chemically stable, thus giving rise to pronounced leakage current increase at an increased temperature.

The inventors conceived that it would be possible to solve the problem of the leakage current increase under high temperature condition by providing, on the oxide film, some suitable material which are not separated even under high temperature condition and which can form a potential barrier with respect to injected electrons, e.g., hydroxide ions. The materials found on the basis of this concept are organic compounds having electron donor groups (i.e., electron donor organic compounds).

It was found that suitable electron donor organic compounds are those having at least one of a carboxyl group, a sulfo group and a phenoxyl group. Examples of organic compounds having a carboxyl group are fatty acids, aromatic acids, etc. Examples of organic compounds having a carboxyl group or a sulfo group are anionic surface active agents. Examples of organic compounds having a phenoxyl group are phenol and derivatives thereof.

Also confirmed to be effective electron donor organic compounds are hydrolysates of silane coupling agents, those of titanium coupling agents and those of aluminum coupling agents.

Some of the electron donor organic compounds mentioned above have a group containing an oxygen atom as the electron donor group. The electron donor group is thought that its oxygen atom electron pair forms covalent bond with a valve action atom, such as a tantalum atom in a tantalum oxide film, thereby supplying electrons to the tantalum oxide to restore the potential barrier while permitting stable presence of the electron donor organic compound on the oxide film.

Examples of electron donor organic compounds are as follows.

(a) Fatty acids, e.g., formic acid, acetic acid, propionic acid, butyric acid, valeric acid, caproic acid, capric acid, lauric acid, myristic acid, palmitic acid, stearic acid, oleic acid, behenic acid, etc.

(b) Aromatic carboxylic acids, e.g., benzoic acid, oxalic acid, acrylic acid, toluic acid, phthalic acid etc.

(c) Anionic surface active agents (carboxylate), e.g., sodium laurate, sodium propionate, etc.

(d) Anionic surface active agents (sulfonate), e.g., sodium isopropylnaphthalene sulfonate, sodium butylnaphthalene sulfonate, etc.

(e) phenol and derivatives thereof, e.g., phenol, p-phenol sulfonic acid, etc.

(f) Silane coupling agents, e.g.,

γ-grycidoxypropyl trimethoxy silane, γ-grycidoxypropyl methyldiethoxy silane, γ-grycidoxypropyl triethoxy silane, γ-metharyloxypropylmethyl dimethoxy silane, γ-methacryloxypropyl trimethoxy silane, γ-methacryloxypropylmethyl diethoxy silane, γ-methacryloxypropyl triethoxy silane, vinyl trimethoxy silane, vinyl triethoxy silane, vinyl tris (β-methoxy-ethoxy) silane, β-(3,4-epoxycyclohexyl) ethyl trimethoxy silane, γ-mercaptopropyl trimethoxy silane, etc.

(g) Titanium coupling agents, e.g., isopropyltriisostearoyl titanate, isopropyltridecylbenzenesulfonyl titanate, isopropyltris (dioctyl pilophosphate) titanate, tetraisopropyl bis (dioctyl phosphite) titanate, tetraoctyl bis (ditridecyl phosphite) titanate, tetra (2,2-diallyloxymethyl-1-butyl) bis (ditridecyl) phosphite titanate, bis (dioctyl pilophosphate) oxyacetate titanate, bis (dioctyl pilophosphate) ethylene titanate, isopropyltrioctanoil titanate, isopropyldimethacrylisostearoyl titanate, isopropylisostearoyldiacryl titanate, isopropyl tri (dioctyl phosphate) titanate, isopropyltricumylphenyl titanate, etc.

(h) Aluminum coupling agents, e.g., acetoalkoxy aluminum diisopropylate, etc.

Of the above electron donor organic compounds, the anionic surface active agents are disclosed in the Japanese Patent Application Kokai Publication No. Hei 3-64013 referred to above as being effective to improve the wetting property of the oxide film surface when forming the conductive polymer layer for preventing electrostatic capacitance reduction and break-down voltage reduction, while also improving tan δ. The silane, titanium and aluminum coupling agents are disclosed in the Japanese Patent Application Kokai Publication No. Hei 2-74021 and Japanese Patent Application Kokai Publication No. Hei 4-73924 referred to above as having an effect of improving the adhesive power between the oxide film and the conductive polymer layer so that such an effect is made use of for preventing the reduction in the electrostatic capacitance and deterioration in the dissipation factor under high temperature conditions. The anionic surface active agents and coupling agents mentioned above, do not have as their general purpose to prevent leakage current increase of the capacitor under high temperature conditions, but they have electron donor property and are effective for the prevention of leakage current increase of the capacitor under high temperature condition as sought by the invention.

The electron donor organic compound layer sufficiently has a thickness corresponding to a mono-layer or about several layers. An excessive thickness rather leads to such an undesired result as equivalent series resistance increase or electrostatic capacitance reduction. High reproducibility and uniform formation of a thin electron donor organic compound layer is thus important. An effective method of forming such a layer is to expose an anode body with an oxide film to vapor of an electron donor organic compound.

An alternative effective method is to dip the anode body in a solution of the electron donor organic compound. In this case, it is preferable for the formation of a thin and uniform layer on the oxide film to use each coupling agent in the form of an alcohol solution rather than the form of an aqueous solution. This is so because the aqueous solution of the coupling agent is liable to become local masses on the oxide film due to low solubility of the agent to water. The masses of the coupling agent is thought to result from condensation of, for instance, silanol groups, which form covalent bonds with the oxide film as a result of dehydration reaction brought about on the oxide film surface, caused by water as solvent. As a result, the coupling agent can no longer be coupled to the oxide film, thus resulting in the formation of its masses which are like water drops. Presumably, such form of coupling agent cannot be stably present on the oxide film and no longer has electron donor property with respect to the oxide film. For the formation of a thin and uniform layer, the coupling agent solution is thus effectively diluted with high solubility alcohol.

Among the coupling agents mentioned above, only the silane coupling agents allow formation of a thin and uniform film using acidic aqueous solution. Silanol groups are instable to "neutral" water, and the dipping of the material in this water results in condensation to form masses. However, they are stable to "acidic" water so that no mass of material is formed as a result of dipping. As an example of the acidic aqueous solution, it may be thought to use an organic compound having an electron donor group, e.g., acetic acid as a variety of fatty acid. In this case, the electron donor property of the hydrolysate of the coupling agent and that of acetic acid are superimposed on each other, so that it is possible to obtain a greater effect of prevention of the leakage current increase under high temperature condition.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, preferred embodiments of the invention are explained with reference to the drawings.

Also, reference is made to some preferred Examples of the solid electrolytic capacitor according to the invention and Comparison Examples of prior art solid electrolytic capacitors.

EXAMPLE 1

Figure 1A:
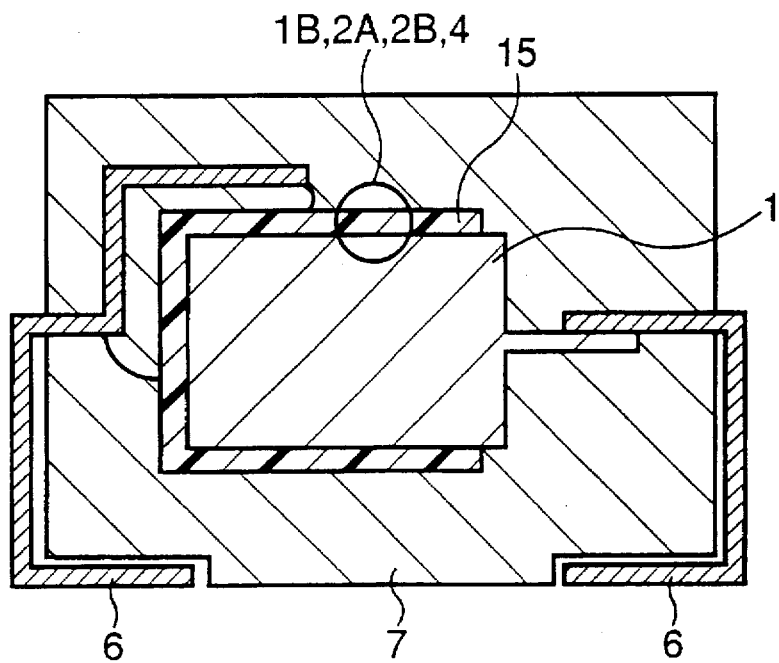
FIGS. 1A and 1B are sectional views showing a solid electrolytic capacitor in Examples 1 to 10 of the invention.
Figure 1B:
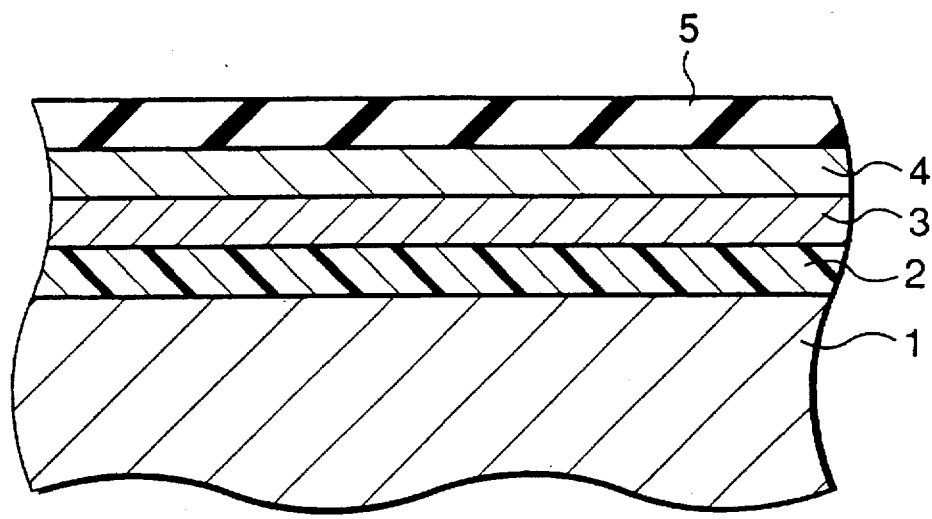

As shown in FIG. 1A and FIG. 1B (a schematic enlarged-scale view), a rectangular sintered mass of fine tantalum particles, having a longitudinal dimension of 3.5 mm, a transversal dimension of 3.0 mm and a thickness of 1.5 mm, was prepared by being subjected to anodic oxidation in a phosphoric acid solution at 90 V, thus obtaining a pellet of tantalum fine particle mass covered by an oxide film 2.

The pellet with the oxide film 2 thus obtained was then held dipped in an alcohol solution containing 2 wt. % lauric acid for 10 min. and then naturally dried at room temperature for 30 min. In this way, a layer 3 of electron donor organic compound, i.e., lauric acid as a variety of fatty acid, was formed on the entire surface of the oxide film 2.

A conductive polymer layer 4 and a cathode side conductive layer 5 were then formed successively by well-known techniques. More specifically, the pellet with the lauric acid layer 3 was held dipped in an ethanol solution containing 2 mol/liter of pyrrole for 10 min. and then dipped in an aqueous solution containing 0.5 mol/liter of ammonium persulfate and 0.05 mol/litter of β-naphthalene sulfonate and α-naphthyl phosphate. The pellet with a polypyrrole layer in this chemical polymerization process, was then energized with a current of 1 mA for 5 hr. in an acetonitrile solution containing 2 mol/litter of pyrrole and 0.05 mol/litter of β-naphthalene sulfonate and α-naphthyl phosphate, thus forming an electrolytic polymerization process polypyrrole layer on the chemical polymerization process polypyrrole layer. Subsequently, the conductive layer 15 was formed by using graphite and silver paste. Then, lead electrodes 6 are provided, and the structure was then enclosed in a resin capsule 7, thus completing Example 1 of solid electrolytic capacitor having the final structure as shown in FIG. 1A. In this capacitor, as shown in the schematic enlarged-scale view in FIG. 1B, the layer 3 of lauric acid is formed on the entire surface of the oxide film 2 as a dielectric, and the layer 4 of polypyrrole is formed on the entire surface of the lauric acid layer 3. The sintered mass of tantalum is a porous body having numerous inner micropores. Microscopically, the micropores complicatedly cross one another, and the surface of the mass is thus abundantly uneven. In FIG. 1B, however, the surface is shown as flat surface for the sake of brevity and facilitating the understanding.

EXAMPLE 2

Using the sintered mass as in Example 1, the oxide film 2 was formed in the manner as in Example 1.

The pellet was then held dipped in an alcohol solution containing 2 wt. % phthalic acid for 10 min. and then naturally dried at room temperature for 30 min. Thus, as shown in FIG. 1B, a layer 3 of electron donor organic compound, i.e., phthalic acid as a variety of aromatic carboxylic acid, was formed on the oxide film 2.

Through the subsequent operation as in Example 1, the solid electrolytic capacitor of Example 2 having the structure as shown in FIG. 1A was obtained. In this capacitor, as shown in the schematic enlarged-scale view of FIG. 1B, the layer 3 of phthalic acid was formed on the entire surface of the oxide film 2 as a dielectric, and the layer 4 of polypyrrole was formed on the entire surface of the phthalic acid layer 3.

EXAMPLE 3

Using the sintered mass as in Example 1, the oxide film 2 was formed in the manner as in Example 1.

The pellet was then held dipped in an alcohol solution containing 2 wt. % sodium laurate for 10 min. and then naturally dried at room temperature for 30 min. Thus, as shown in FIG. 1B, a layer 3 of electron donor organic compound, i.e., sodium laurate as a variety of anionic surface active agent (carboxylate), was formed on the oxide film 2.

Through the subsequent operation as in Example 1, the solid electrolytic capacitor of Example 3 having the structure as shown in FIG. 1A was obtained. In this capacitor, as shown in the schematic enlarged-scale view of FIG. 1B, the layer 3 of sodium laurate was formed on the entire surface of the oxide film 2 as a dielectric, and the layer 4 of polypyrrole was formed on the entire surface of the sodium laurate layer 3.

EXAMPLE 4

Using the sintered mass as in Example 1, the oxide film 2 was formed in the manner as in Example 1.

The pellet was then held dipped in an alcohol solution containing 2 wt. % of sodium butylnaphthalene sulfonate for 10 min. and then naturally dried at room temperature for 30 min. Thus, as shown in FIG. 1B, a layer 3 of electron donor organic compound, i.e., sodium butylnaphthaline sulfonate as a variety of anionic surface active agent (sulfonate), was formed on the oxide film 2.

Through the subsequent operation as in Example 1, the solid electrolytic capacitor of Example 4 having the structure as shown in FIG. 1A was obtained. In this capacitor, as shown in the schematic enlarged-scale view of FIG. 1B, the layer 3 of sodium butylnaphthalene sulfonate was formed on the entire surface of the oxide film 2 as a dielectric, and the layer 4 of polypyrrole was formed on the entire surface of the sodium butylnaphthalene sulfonate layer 3.

EXAMPLE 5

Using the sintered mass in Example 1, the oxide film 2 was formed in the manner as in Example 1.

The pellet was then held dipped in an alcohol solution containing 2 wt. % p-phenol sulfonic acid for 10 min. and then naturally dried at room temperature for 10 min. Thus, as shown in FIG. 1B, a layer 3 of electron donor organic compound, i.e., p-phenol sulfonic acid as a variety of phenol derivative, was formed on the oxide film 2.

Through the subsequent operation as in Example 1, the solid electrolytic capacitor of Example 5 having the structure as shown in FIG. 1A was obtained. In this capacitor, as shown in the schematic enlarged-scale view of FIG. 1B, the layer 3 of p-phenol sulfonic acid was formed on the entire surface of the oxide film 2 as a dielectric, and the layer 4 of polypyrrole was formed on the entire surface of the p-phenol sulfonic acid layer 3.

EXAMPLE 6

Using the sintered mass as in Example 1, the oxide film 2 was formed in the manner as in Example 1.

The pellet was then held dipped in a methanol solution containing 2 wt. % γ-grycidoxypropyl trimethoxy silane for 10 min. and then naturally dried at room temperature for 24 hr. Thus, as shown in FIG. 1B, a layer 3 of electron donor organic compound, i.e., hydrolysate of γ-grycidoxypropyl trimethoxy silane as a variety of hydrolysate of silane coupling agent, was formed on the oxide film 2.

Through the subsequent operation as in Example 1, the solid electrolytic capacitor of Example 6 having the structure as shown in FIG. 1A was obtained. In this capacitor, as shown in the schematic enlarged-scale view of FIG. 1B, the layer 3 of hydrolysate of γ-grycidoxypropyl trimethoxy silane was formed on the entire surface of the oxide film 2 as a dielectric, and the layer 4 of polypyrrole was formed on the entire surface of the γ-grycidoxypropyl trimethoxy silane hydrolysate layer 3.

EXAMPLE 7

Using the sintered mass as in Example 1, the oxide film 2 was formed in the manner as in Example 1.

Then, the pellet was held exposed to vapor of γ-grycidoxypropyl trimethoxy silane for one hour and then naturally dried at room temperature for 24 hr. Thus, as shown in FIG. 1B, a layer 3 of electron donor organic compound, i.e., hydrolysate of γ-grycidoxypropyl trimethoxy silane as a variety of hydrolysate of silane coupling agent was provided on the oxide film 2.

Through the subsequent operation as in Example 1, the solid electrolytic capacitor of Example 7 having the structure as shown in FIG. 1A was obtained. In this capacitor, as shown in the schematic enlarged-scale view of FIG. 1B, the layer 3 of hydrolysate of γ-grycidoxypropyl trimethoxy silane was formed on the entire surface of the oxide film 2 as a dielectric, and the layer 4 of polypyrrole was formed on the entire surface of the γ-grycidoxypropyl trimethoxy silane hydrolysate layer 3.

EXAMPLE 8

Using the sintered mass as in Example 1, the oxide film 2 was formed in the manner as in Example 1.

The pellet was then held dipped in a methanol solution containing γ-grycidoxypropyl trimethoxy silane used in Example 6 for 10 min. and then naturally dried at room temperature for 24 hr. The operation of the dipping and drying was done twice to form a layer 3 of electron donor organic compound, i.e., hydrolysate of γ-grycidoxypropyl trimethoxy silane as a variety of silane coupling agent on the oxide film 2, as shown in FIG. 1B.

Through the subsequent operation as in Example 1, the solid electrolytic capacitor of Example 8 having the structure as shown in FIG. 1A was obtained. In this capacitor, as shown in the schematic enlarged-scale view of FIG. 1B, the layer of γ-grycidoxypropyl trimethoxy silane was formed on the entire surface of the oxide film 2 as a dielectric, and the layer 4 of polypyrrole was formed on the entire surface of the γ-grycidoxypropyl trimethoxy silane hydrolysate layer 3.

EXAMPLE 9

Using the sintered mass as in Example 1, the oxide film 2 was formed in the manner as shown in Example 1.

The pellet was then held dipped in an alcohol solution containing 2 wt. % acetoalkoxy aluminum diisopropylate for 10 min. and then naturally dried at room temperature for 24 hr. Thus, as shown in FIG. 1B, a layer 3 of electron donor organic compound, i.e., hydrolysate of acetoalkoxy aluminum diisopropylate as a variety of hydrolysate of aluminum coupling agent, was formed on the oxide film 2.

Through the subsequent operation as in Example 1, the solid electrolytic capacitor of Example 9 having the structure as shown in FIG. 1A was obtained. In this capacitor, as shown in the schematic enlarged-scale view of FIG. 1B, the layer 3 of hydrolysate of acetoalkoxy aluminum diisopropylate was formed on the entire surface of the oxide film 2 as a dielectric, and the layer 4 of polypyrrole was formed on the entire surface of the acetoalkoxy aluminum diisopropylate layer 3.

EXAMPLE 10

Using the sintered mass as in Example 1, the oxide film 2 was formed in the manner as in Example 1.

The pellet was then held dipped in an alcohol solution containing 2 wt. % of acetoalkoxy aluminum diisopropylate for 10 min and then naturally dried at room temperature for 24 hr. Thus, as shown in FIG. 1B, a layer 3 of electron donor organic compound, i.e., hydrolysate of acetoalkoxy aluminum diisopropylate as a variety of hydrolysate of aluminum coupling agent, was formed on the oxide film 2.

A layer 4 of polyaniline, a conductive polymer, was then formed by a well-known technique. More specifically, the pellet was held dipped in an aqueous solution containing 30 wt. % of potassium bichromate for 5 min., then held dipped in a solution containing 5 wt. % of aniline and p-toluenesulfonic acid at room temperature for 5 min., and then held in air for 30 min. polymerization was done in this way. The series of operations of charging the oxidizer, and contacting and polymerizing the solution containing aniline monomer and p-toluenesulfonic acid, was done five times to form a black polyaniline layer.

Subsequently, as in Example 1, the conductive layer 15 was formed, the lead electrodes 6 were provided, and then the system was enclosed in the resin capsule 7, thus completing Example 10 of solid electrolytic capacitor as shown in FIG. 1A. In this capacitor, as shown in the schematic enlarged-scale view of FIG. 1B, the layer 3 of hydrolysate of acetoalkoxy aluminum diisopropylate was formed on the entire surface of the oxide film 2 as a dielectric, and the layer of polypyrrole was formed on the entire surface of the acetoalkoxy aluminum diisopropylate hydrolysate layer 3.

EXAMPLE 11

Using the sintered mass as in Example 1, the oxide film 2 was formed in the manner as in Example 1.

Figure 2A:
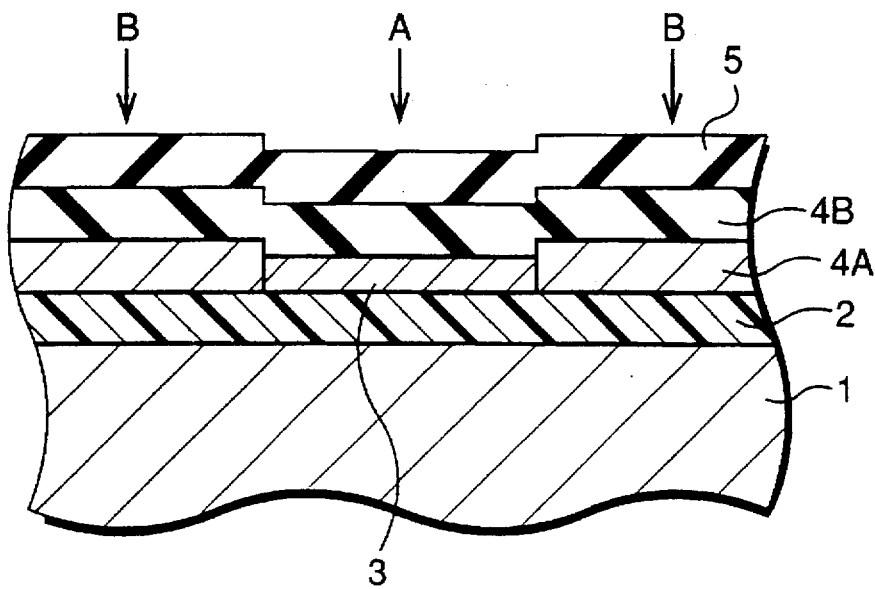
FIGS. 2A and 2B are sectional views showing the solid electrolytic capacitors in Examples 11 and 12 of the invention.

Then, as shown in FIG. 2A, a layer 4A of polypyrrole was formed as conductive polymer layer on the oxide film 2 by the chemical polymerization process as in Example 1. The polypyrrole layer 4A was formed to be so thin as to partly expose the oxide film 2. In FIG. 2A, as in FIG. 1B, the surface of the sintered mass of tantalum is shown as a flat surface.

Then, as in Example 1, the pellet with the polypyrrole layer 4A was held dipped in an alcohol solution containing 2 wt. % lauric acid for 10 min. and then naturally dried at room temperature for 30 min. A layer 3 of electron donor organic compound, i.e., lauric acid as a variety of fatty acid, was thus formed on the portion of the oxide film 2 that was not covered by the polypyrrole layer 4A. That is, the lauric acid layer 3 was formed only on the exposed surface of the oxide film 2. This is thought to be due to weak binding power between lauric acid as electron donor organic compound and polypyrrole as conductive polymer because both of them emit electrons and do not form covalent bond together.

A layer 4B of electrolytically polymerized polypyrrole was formed on the chemically polymerized polypyrrole layer 4A and lauric acid layer 3 by the electrolytic polymerization process as in Example 1. This electrolytically polymerized polypyrrole layer 4B and the lower polypyrrole layer 4A constitute the conductive polymer layer 4 as a solid electrolyte. The upper polypyrrole layer 4B was formed on the lauric acid layer 3 as electron donor organic compound as well as the lower polypyrrole layer 4A. This is considered to be attributable to the status of the lauric acid layer 3 which forms covalent bonds with the dielectric oxide film 2 so that it lacks electrons on its side in contact with the other layer, i.e., conductive polypyrrole layer 4B, thus forming covalent bonds with the polypyrrole layer 4B.

Subsequently, as in Example 1, the conductive layer 15 was formed, the lead electrodes 6 were provided, and then the system was enclosed in the resin capsule 7, thus completing Example 11 of solid electrolytic capacitor as shown in FIG. 1A. In this capacitor, as shown in the schematic enlarged-scale view of FIG. 2A, the dielectric oxide film 2 has a portion not covered by the chemically polymerized polypyrrole layer 4A and, over this portion, the lauric acid layer 3 as electron donor organic compound was formed via the electrolytically polymerized polypyrrole layer 4B.

EXAMPLE 12

Using the sintered mass as in Example 1, the oxide film 2 was formed in the manner as in Example 1.

Figure 2B:
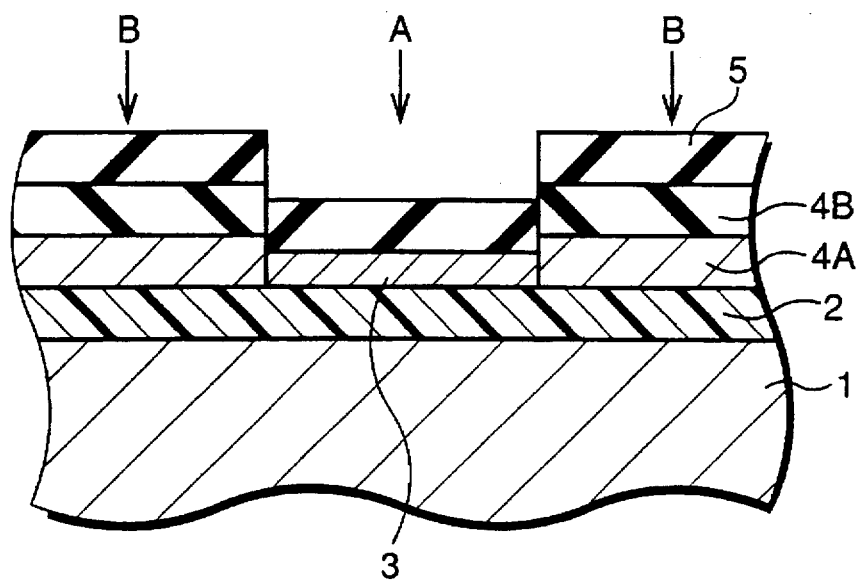

Then, as shown in FIG. 2B, a chemically polymerized polypyrrole layer 4A and an electrolytically polymerized polypyrrole layer 4B are formed as conductive polymer layers on the oxide film 2 by the chemical polymerization process and electrolytic polymerization process as in Example 1. The polypyrrole layer 4A was formed such that it was so thin that the oxide film 2 was partly exposed from the polypyrrole layers 4A and 4B. In FIG. 2B, as in FIG. 1B, the surface of the sintered mass of tantalum is shown as flat surface.

Then, as in Example 1, the pellet with the polypyrrole layers 4A and 4B was held dipped in an alcohol solution containing 2 wt. % lauric acid for 10 min. and then naturally dried at room temperature for 30 min. Thus, a layer of electron donor organic compound, i.e., lauric acid as a variety of fatty acid, was formed on the portion of oxide film 2 not covered by the polypyrrole layers 4A and 4B. Again in this Example, as in Example 11, the lauric acid layer 3 was formed on the portion of the oxide film 2 exposed by the polypyrrole layers 4A and 4B.

Subsequently, as in Example 1, the conductive layer 15 was formed, the lead electrodes 6 were provided, and then the system was enclosed in the resin capsule 7, thus completing Example 12 of solid electrolytic capacitor as shown in FIG. 1A. In this capacitor, as shown in the schematic enlarged-scale view of FIG. 2B, the dielectric oxide film 2 has a portion not covered by the polypyrrole layers 4A and 4B, and over this portion the cathode side conductive layer 5 is formed via the lauric acid layer 3 as electron donor organic compound.

Comparison Example 1

Using the sintered mass as in Example 1, the oxide film 2 was formed in the manner as in Example 1.

Then, as in Example 1, the conductive polymer layer (i.e., polypyrrole layer) 4 and conductive layer 5 were formed successively, then the lead electrodes 6 were provided, and then the system was enclosed in the resin capsule 7, thus completing Comparison Example 1 of solid electrolytic capacitor. This Comparison Example 1 capacitor is different from the capacitor shown in FIG. 1B in that it does not have electron donor organic compound layer 3 so that the oxide film 2 and the polypyrrole layer 4 are in direct contact with each other.

Comparison Example 2

Figure 4:
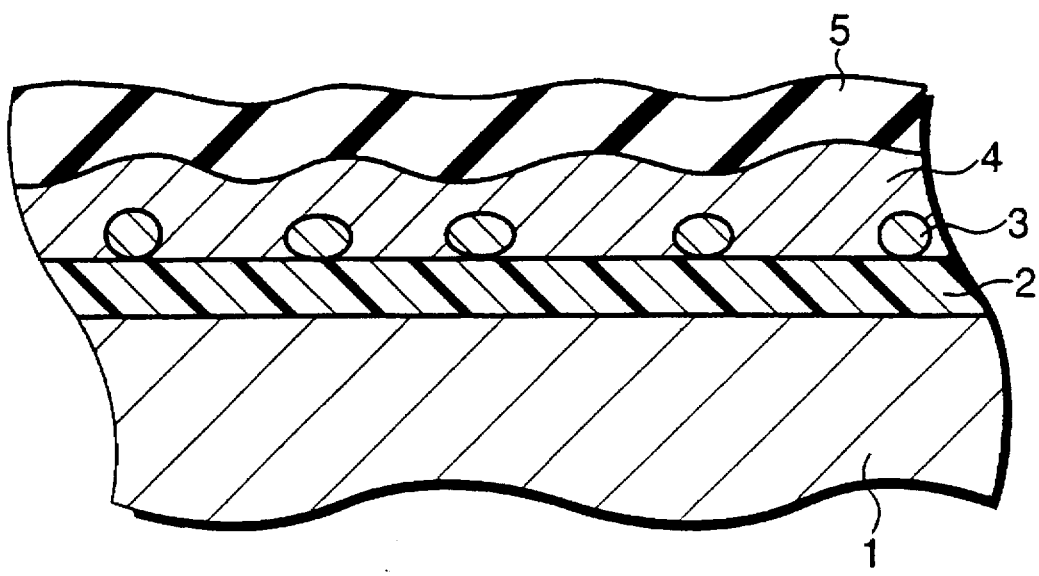
FIG. 4 is a sectional view showing Comparison Example 2 in the prior art.

Comparison Example 2 is a capacitor, which was obtained by using an aqueous solution of a silane coupling agent when forming the electron donor organic compound layer 3 (see FIG. 4). Specifically, in this Comparison Example, by using the sintered mass as in Example 1 the oxide film 2 was formed in the manner as in Example 1.

The pellet was then held dipped in an aqueous solution containing 2 wt. % γ-grycidoxypropyl trimethoxy silane for 10 min and then naturally dried at room temperature for 24 hr.

Subsequently, as in Example 1, the polypyrrole layer 4 as a solid electrolyte and the cathode side conductive layer 5 were formed successively, the lead electrodes 6 were provided, and then the system was enclosed in the resin capsule 7, thus completing Comparison Example 2 of the solid electrolytic capacitor. In this Comparison Example 2 capacitor, as shown in FIG. 4, electron donor organic compound (γ-grycidoxypropyl trimethoxy silane hydrolysate layer) is locally present like water drops between the oxide film 2 and the conductive polymer layer (i.e., polypyrrole layer) 4. (This will be described later in detail.)

Figure 3A:
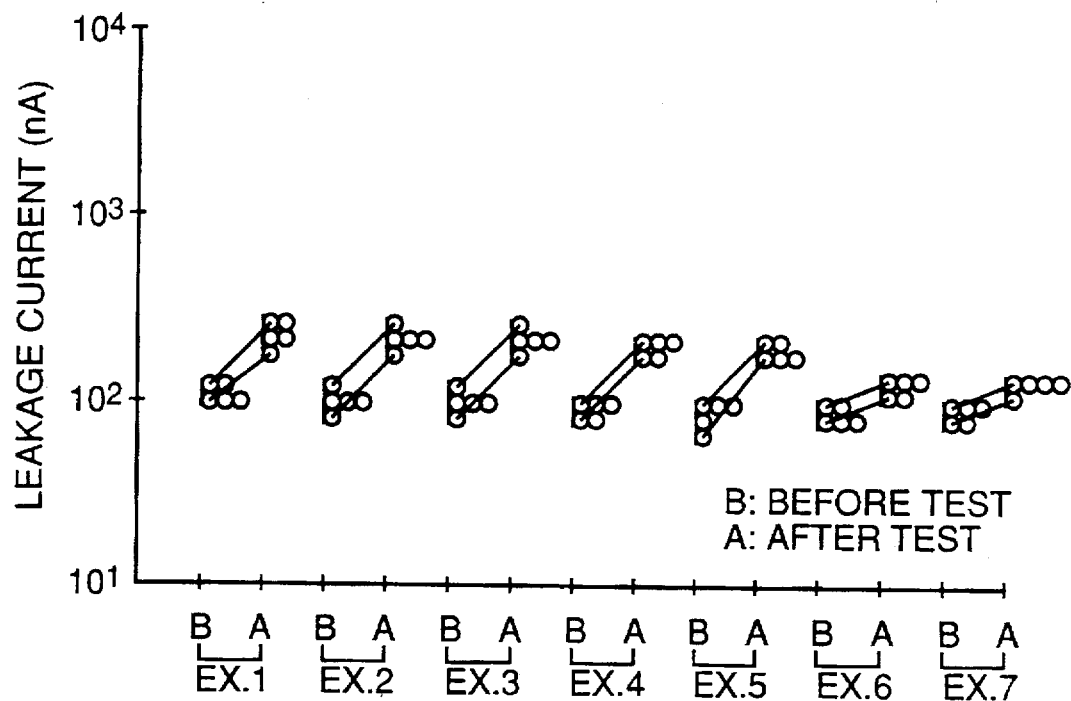
FIGS. 3A and 3B are graphs showing leakage current before and after high temperature test on the solid electrolytic capacitors in the Examples and Comparison Examples.
Figure 3B:
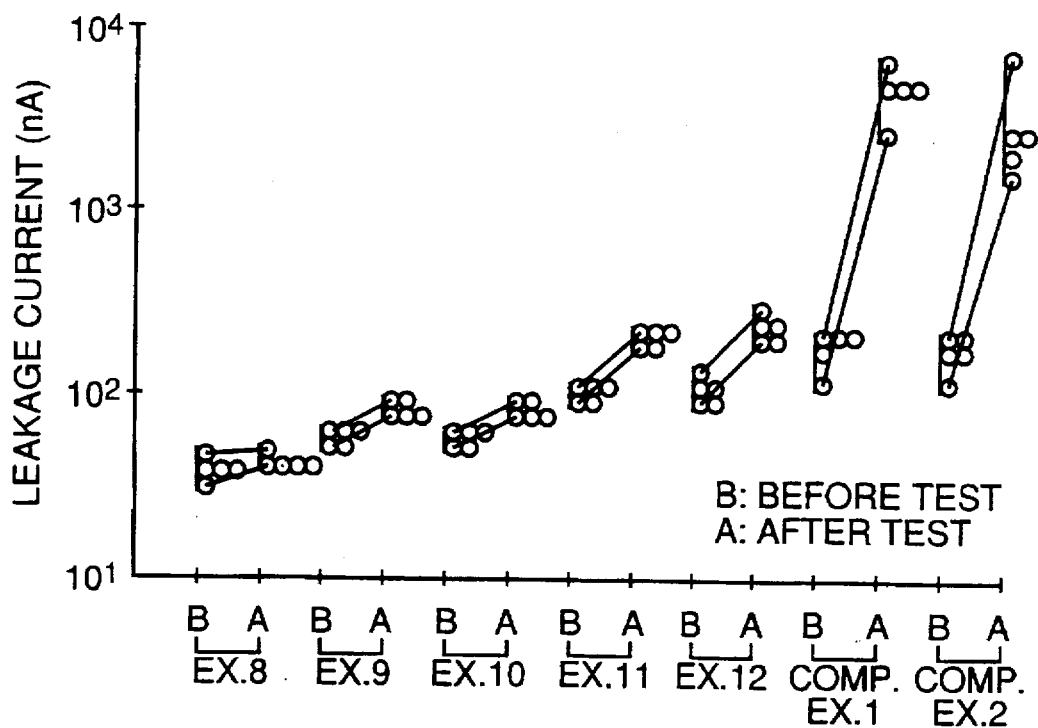

FIGS. 3A and 3B show results of high temperature tests conducted on Examples 1 to 12 and Comparison Examples 1 and 2 described above. In the test, each sample was left in an environment of a relative humidity of 5% RH or below and at a temperature of 85° C. for 500 hr, and the leakage currents in the capacitor before and after the tests were compared. The test was done on five samples in each Example and each Comparison Example. Of Examples 1 to 12 and Comparison Examples 1 and 2, the structure of Examples 1 to 10 and Comparison Examples 1 and 2 (in which the conductive polymer layer 4 is formed on the entire surface of the dielectric oxide film 2 as shown in FIG. 1B) is referred to as "entirely covered type", and the structure of Examples 11 and 12 (in which the oxide film 2 is partly exposed from the conductive polymer layer 4A, i.e., the lower layer of the double layer structure conductive polymer layer as shown in FIGS. 2A and 2B) is referred to as "partly covered type".

Comparison Example 1 (i.e., entirely covered type capacitor which does not have the electron donor organic compound layer 3).and Examples 1 to 9 (i.e., entirely covered type capacitors which have the electron donor organic compound layer 3), will now be compared with reference to FIGS. 3A and 3B. In Comparison Example 1 the leakage current is increased by about 100 times after the test, while in any of Examples 1 to 9 it is only approximately doubled at the most. It is thus obvious that the layer 3 provided between the oxide film 2 and the conductive polymer layer 4 in each Example, i.e., each of the layers of fatty acid, aromatic carboxylic acid, anionic surface active agent (carboxylate and sulfonate), phenol derivative, silane coupling agent hydrolysate and aluminum coupling agent hydrolysate, has electron donor property and is effective for preventing leakage current increase under high temperature condition.

From the results of tests of Examples 6 and 7, it is obvious that the same effects are obtainable by adopting, for the formation of the electron donor organic compound 4, either the process in which the pellet is held dipped in the solution of the electron donor organic compound, or the process in which the pellet is exposed to the vapor of that compound. From the results of test on Examples 6 and 8, it is obvious that, in the case of dipping, the pellet may be held dipped repeatedly as well.

From the results of tests of Examples 9 and 10, it may be said that not only polypyrrole but also polyaniline permits obtaining the functions and effects of electron donor organic compounds, and it is not limited to use one particular type of conductive polymer.

When Comparison Example 2 (in which a neutral aqueous solution of silane coupling agent is used as electron donor organic compound formation solution) and Example 6 (in which a methanol solution of silane coupling agent is used) are compared, it is noted that, in the Comparison Example 2, the leakage current is increased after the test by about 100 times, while in Example 6 the current increase is about 1.2 times at the most. It is thus obvious that it is important, in the dipping process of silane coupling agent hydrolysate layer formation, to use an alcohol solution of the coupling agent rather than a neutral aqueous solution thereof. The above difference of effects is considered to be attributable to the difference of the solubility of the coupling agent to solvents, the solubility being higher to alcohol than to water. In Comparison Example 2 using water as solvent, the coupling agent is condensed to become masses like water drops on the oxide film 2 as shown in FIG. 4, thus producing portions of the oxide film which are not covered by the coupling agent hydrolysate. In addition, no covalent bond is formed with the oxide film 2 by the coupling agent in the form of masses. This means that actually no electron donor organic compound layer is present on the oxide film 2, which is a cause of leakage current increase in Comparison Example 2. In Example 6 which uses high solubility methanol as solvent of the coupling agent, a thin and uniform layer 3 of coupling agent hydrolysate is formed on the oxide film 2, as shown in FIG. 1B. This layer forms covalent bonds with the oxide film 2 to provide the electron donor property. The difference of the effects of Example 6 and Comparison Example 2 are thought to be due to the above cause.

From the results of tests of Example 1 and Examples 11 and 12, it is obvious that the same effect of preventing leakage current increase under high temperature condition, is obtainable irrespective of whether the capacitor is of the entirely or partly covered type. To consider this in detail, the partly covered type capacitors shown in FIGS. 2A and 2B are now assumed to be ones in which the layer 3 of electron donor organic compound (i.e., lauric acid) is not present on the portion of oxide film 2 not covered by the layer 4A of conductive polymer (i.e., polypyrrole in Examples 11 and 12) as shown by downwardly directed arrow A. In such a case, the portion of oxide film 2 which is covered by the conductive polymer layer 4A, as shown by downwardly directed arrows B, is electron-lacking because of electron pull-out by the oxide film, while the portion not covered by the conductive polymer layer 4A as shown by the arrow A is free from electron pull-out by the oxide film. An electron concentration slope is thus formed in the oxide film 2 between the portions shown by the arrows A and B. With this electron concentration slope, electrons tend to be moved from high electron concentration portion as shown by the arrow A to the low electron concentration portion as shown by the arrows B to compensate for the electron pull-out by the portion of the oxide film under the conductive polymer layer 4A. However, without an electron donor organic compound layer as a source of electrons on the portion shown by the arrow A, the electron pull-out by the oxide film 2 cannot be completely compensated for, thus providing a low potential barrier state with respect to electrons as a hole. In contrast, in Examples 11 and 12, the electron donor organic compound layer 3 which is formed on the oxide film portion shown by the arrow A, serves as an electron source with respect to the oxide film portion shown by the arrow A and sufficiently compensates for the electron pull-out from the portion shown by the arrows B. Thus, complete potential barrier level recovery with respect to electrons is obtained in the entire oxide film 2. In this way, leakage current increase under high temperature condition is prevented. insofar as no effect difference is found between Examples 11 and 12, the same high temperature leakage current increase prevention effect is obtainable irrespective of whether the conductive polymer layer 4B is provided (as in Example 11 shown in FIG. 2A) or not (as in Example 12 shown in FIG. 2B) on the electron donor organic compound 3 on the portion shown by the arrow A.

The partly covered type capacitor as in Examples 11 and 12 has the following advantages. That is, in the entirely covered type capacitor as in Example 1, the electron donor organic compound layer 3 is formed subsequent to the formation of the oxide film 2 and prior to the formation of the conductive polymer layer 4. The electron donor organic compound 3, depending on the conditions of its formation, may have poor thickness reproducibility, not be uniform in thickness but be partly thicker, or fail to exhibit electron donor property as in the case of the aqueous solution of coupling agent as mentioned above. In the entirely covered type capacitor, such structural defect of the electron donor organic compound has direct adverse effects, resulting in electrostatic capacitance reduction and equivalent series resistance increase. In contrast, the partly covered type capacitor is not directly affected by such defect of the electron donor organic compound layer because the conductive polymer layer 4A is formed prior to the formation of the electron donor organic compound layer.

As has been described in the foregoing, the solid electrolytic capacitor according to the invention, which uses a conductive polymer as the solid electrolyte, features an electron donor organic compound (excluding anionic surface active agent, silane coupling agent, aluminum coupling agent and titanium coupling agent) provided between the oxide film as a dielectric and the conductive polymer layer. It is thus possible, according to the invention, to provide a solid electrolytic capacitor which is free from leakage current increase under high temperature condition.

The method for fabricating solid electrolytic capacitor according to the invention, which solid electrolytic capacitor has a layer of electron donor organic compound features exposing a valve action metal body with an oxide film to vapor of an electron donor organic compound in a step of forming a layer of the electron donor organic compound. It is thus possible according to the invention to form the electron donor organic compound layer so as to be thin and uniform on the oxide film irrespective of the kind of electron donor organic compound. This permits provision of a solid electrolytic capacitor, which is free from electrostatic capacitance reduction and equivalent series resistance increase as well as being free from leakage current increase under high temperature condition.

The method for fabricating a solid electrolytic capacitor according to the invention, which solid electrolytic capacitor has an electron donor organic compound layer, features pellet dipping in an electron donor organic compound solution (excluding solution of anionic surface active agent, neutral solution of silane coupling agent, aqueous solution of titanium coupling agent and aqueous solution of aluminum coupling agent). It is thus possible according to the invention to form a layer of desired electron donor organic compound so as to be thin and uniform on the oxide film. This permits provision of a solid electrolytic capacitor, which is free from electrostatic capacitance reduction and equivalent series resistance increase as well as being free from leakage current increase under high temperature condition.

The solid electrolytic capacitor according to the invention, which uses a conductive polymer as the solid electrolyte, features a layer of an electron donor organic compound formed on a portion of the dielectric oxide film that is not covered but exposed from the conductive polymer layer. It is thus possible according to the invention to provide a solid electrolytic capacitor which is free from leakage current increase under high temperature condition. The electron donor organic compound in this solid electrolytic capacitor may be an anionic surface active agent, a silane coupling agent hydrolysate, an aluminum coupling agent hydrolysate and a titanium coupling agent hydrolysate.

The method for fabricating the solid electrolytic capacitor having the above structure according to the invention, features exposing a valve action metal body with the conductive polymer layer to vapor of an electron donor organic compound in the electron donor organic compound formation step. It is thus possible according to the invention to form the electron donor organic compound layer so as to be thin and uniform irrespective of the kind of electron donor organic compound. This permits provision of a solid electrolytic capacitor which is free from electrostatic capacitance reduction and equivalent resistance increase as well as being free from leakage current increase under high temperature condition.

The method for fabricating a solid electrolytic capacitor according to the invention further features dipping, a valve action metal body with a conductive polymer layer in an electron donor organic compound solution (excluding neutral solution of silane coupling agent, aqueous solution of aluminum coupling agent and aqueous solution of titanium coupling agent). It is thus possible according to the invention to form a layer of a desired thin and uniform electron donor organic compound. This permits provision of a solid electrolytic capacitor free from leakage current increase under high temperature condition.

In the method for fabricating a solid electrolytic capacitor according to the invention, an alcohol solution of the silane coupling agent, aluminum coupling agent or titanium coupling agent, is used as the electron donor organic compound, which the valve action metal body with the oxide film is dipped in. It is thus possible according to the invention to form the oxide film so as to be thin and uniform so long as the electron donor organic compound is a coupling agent hydrolysate. This permits provision of a solid electrolytic capacitor using hydrolysate of silane coupling agent, aluminum coupling agent or titanium coupling agent as the electron donor organic compound, which solid electrolytic capacitor is free from electrostatic capacitance reduction and equivalent series resistance increase as well as being free from leakage current increase under high temperature condition.

According to the invention, it is thus possible, by using an acidic solution as each coupling agent solution noted above, to obtain the same effects as in the case of using alcohol solution.

Particularly, pronounced effects are obtainable when the invention is applied to solid electrolytic capacitors using tantalum as the valve action metal.

What is claimed is:

1. A solid electrolytic capacitor comprising:
   a valve action metal body as an anode side electrode;
   an oxide film as a dielectric obtained by oxidizing a surface of said valve action metal body;
   an electron donor organic compound layer formed of an organic compound having an electron donor group covering an entire surface of said oxide film, said electron donor organic compound excluding an ionic surface active agent, a silane coupling agent, an aluminum coupling agent and a titanium coupling agent; and
   a conductive polymer layer as a solid electrolyte layer covering an entire surface of said electron donor organic compound layer.

2. The solid electrolytic capacitor according to claim 1, wherein said organic compound contains at least one of carboxyl group and phenoxyl group.

3. The solid electrolytic capacitor according to claim 1, wherein said organic compound is a member selected from the group consisting of fatty acid, aromatic carboxylic acid, phenol and phenol derivatives.

4. The solid electrolytic capacitor according to claim 1, wherein the metal of said valve action metal body is tantalum.

5. A method for fabricating the solid electrolytic capacitor according to claim 1, said method comprising:
   forming said oxide film;
   forming said electron donor electron compound layer on said oxide film; and
   forming said conductive polymer layer on said electron donor organic compound layer;
   said forming said electron donor organic compound layer being carried out by exposing said valve action metal body, after said oxide film has been formed thereon, to vapor of said electron donor organic compound.

6. A method for fabricating a solid electrolytic capacitor according to claim 1, said method comprising:
   forming said oxide film;
   forming said electron donor electron compound layer on said oxide film; and
   forming said conductive polymer layer on said electron donor organic compound layer;
   said forming said electron donor organic compound layer being carried out such that said valve action metal layer with the oxide film is dipped in a solution of said organic compound.

7. The solid electrolytic capacitor according to claim 1, wherein said electron donor organic compound is a fatty acid.

8. The solid electrolytic capacitor according to claim 1, wherein said electron donor organic compound is an aromatic carboxylic acid.

9. The solid electrolytic capacitor according to claim 1, wherein said electron donor organic compound is a sulfonate.

10. The solid electrolytic capacitor according to claim 1, wherein said electron donor organic compound is selected from the group consisting of phenol and derivatives of phenol.

11. A method for fabricating the solid electrolytic capacitor having a valve action metal body as an anode side electrode, an oxide film as a dielectric obtained by oxidizing a surface of said valve action metal body, an electron donor organic compound layer formed of an organic compound having an electron donor group and covering an entire surface of said oxide film, and a conductive polymer layer as a solid electrolyte layer covering an entire surface of said electron donor organic compound layer, said method comprising:
   forming said oxide film;
   forming said electron donor electron compound layer on said oxide film; and
   forming said conductive polymer layer on said electron donor organic compound layer;
   said forming said electron donor organic compound layer being carried out by exposing said valve action metal body, after said oxide film has been formed thereon, to vapor of said electron donor organic compound.

12. The method for fabricating a solid electrolytic capacitor according to claim 4, wherein the metal of said valve action metal body is tantalum.

13. A method for fabricating a solid electrolytic capacitor having a valve action metal body as an anode side electrode, an oxide film as a dielectric obtained by oxidizing a surface of said valve action metal body, an electron donor organic compound layer formed of an organic compound having an electron donor group and covering an entire surface of said oxide film, and a conductive polymer layer as a solid electrolyte layer covering an entire surface of said electron donor organic compound layer, said method comprising:
   forming said oxide film;
   forming said electron donor electron compound layer on said oxide film; and
   forming said conductive polymer layer on said electron donor organic compound layer;

said forming said electron donor organic compound layer being carried out such that said valve action metal layer with the oxide film is dipped in a solution of said organic compound.

14. The method for fabricating a solid electrolytic capacitor according to claim 13, wherein:

the solution of said organic compound is a member of the group consisting of an alcohol solution of a silane coupling agent, an alcohol solution of an aluminum coupling agent, and an alcohol solution of a titanium coupling agent.

15. The method for fabricating a solid electrolytic capacitor according to claim 5, wherein:

the solution of said organic compound is an acidic aqueous solution of a silane coupling agent.

16. The method according to claim 13, wherein said electron donor organic compound layer comprises a silane coupling agent and said solution is an acidic aqueous solution comprising a fatty acid.

17. The method according to claim 5, wherein said electron donor organic compound layer comprises a silane coupling agent and said solution is an acidic aqueous solution comprising acetic acid.

18. A solid electrolytic capacitor comprising:

a valve action metal body as an anode side electrode;

an oxide film as a dielectric obtained by oxidizing a surface of said valve action metal body;

a conductive polymer layer as a solid electrolyte layer covering said oxide film so as to expose a portion thereof; and an electron donor organic compound layer formed of an organic compound having an electron donor group and covering said portion of said oxide film exposed from said conductive polymer layer.

19. The solid electrolytic capacitor according to claim 6, which further comprises a second conductive polymer layer covering the conductive polymer layer on said oxide film and the electron donor organic oxide layer on said exposed portion of said oxide film.

20. A method for fabricating a solid electrolytic capacitor having a valve action metal body as an anode side electrode; an oxide film as a dielectric obtained by oxidizing a surface of said valve action metal body; a conductive polymer layer as a solid electrolyte layer covering said oxide film so as to expose a portion thereof; and an electron donor organic compound layer formed of an organic compound having an electron donor group and covering said portion of said oxide film exposed from said conductive polymer layer, said method comprising:

forming said oxide film;

forming said conductive polymer layer on said oxide film so as to expose a portion thereof; and forming said electron donor organic compound layer.

21. The method for fabricating a solid electrolytic capacitor according to claim 8, wherein said forming said electron donor organic compound layer is carried out by exposing said valve action metal body, after said oxide film has been formed thereon, to vapor of electron donor organic compound.

22. The method for fabricating a solid electrolytic capacitor according to claim 8, wherein said forming said electron donor organic compound layer is carried out such that said valve action metal body with said conductive polymer layer is dipped in a solution of said organic compound.

23. The method for fabricating a solid electrolytic capacitor according to claim 10, wherein said solution of said organic compound is a member of the group consisting of an alcohol solution of a silane coupling agent, an alcohol solution of an aluminum coupling agent and an alcohol solution of a titanium coupling agent.

24. The method for fabricating a solid electrolytic capacitor according to claim 10, wherein the solution of said organic compound is an acidic aqueous solution of a silane coupling agent.

25. The method according to claim 23, wherein the acidic aqueous solution comprises a fatty acid.

26. The method for fabricating a solid electrolytic capacitor according to claim 24, wherein the fatty acid is acetic acid.

\* \* \* \* \*